United States Patent
DeLuca et al.

(10) Patent No.: US 9,774,993 B1
(45) Date of Patent: Sep. 26, 2017

(54) SYSTEM, METHOD, AND RECORDING MEDIUM FOR GEOFENCE FILTERING

(71) Applicant: International Business Machines Corporation, Armonk, NY (US)

(72) Inventors: Lisa Seacat DeLuca, Baltimore, MD (US); Jeremy Adam Greenberger, Raleigh, NC (US); James Robert Kozloski, New Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/156,426

(22) Filed: May 17, 2016

(51) Int. Cl.
  *H04W 4/02*  (2009.01)
  *H04W 72/06*  (2009.01)

(52) U.S. Cl.
  CPC ........... *H04W 4/021* (2013.01); *H04W 4/023* (2013.01); *H04W 72/06* (2013.01)

(58) Field of Classification Search
  CPC ............. H04L 61/2007; H04L 61/1511; H04L 61/609; H04L 67/18; G06F 3/0481; G06F 17/30194; G06F 17/3007; G06F 17/30598; G06F 17/30241; G09B 29/003; G01S 19/02; G01S 19/34; G06Q 30/0205; H04W 4/028; H04W 48/04; H04W 4/021
  USPC ........... 455/456.3, 456.1, 457; 701/454, 468, 701/409; 340/995.1
  See application file for complete search history.

(56) References Cited

U.S. PATENT DOCUMENTS

| | | | |
|---|---|---|---|
| 2014/0274115 | A1 | 9/2014 | Michalson et al. |
| 2014/0337123 | A1 | 11/2014 | Nuernberg et al. |
| 2014/0365304 | A1 | 12/2014 | Showers et al. |
| 2015/0106449 | A1* | 4/2015 | Cherry ................. H04L 65/403 709/204 |
| 2016/0266258 | A1* | 9/2016 | Huang .................... G01S 19/34 |

OTHER PUBLICATIONS

Anonymously; "Cognitive Activation of a Panic Mode of Operation for a Mobile Device"; http://ip.com/IPCOM/000244805D; Jan. 27, 2016.

Anonymously; "Detection of a known contact currently using a mobile device via data aggregation/analysis and controlling access to the device"; http://ip.com/IPCOM/000238273D; Aug. 13, 2014.

* cited by examiner

*Primary Examiner* — Phuoc H Doan
(74) *Attorney, Agent, or Firm* — Alexa L. Ashworth, Esq.; McGinn IP Law Group, PLLC

(57) ABSTRACT

A geofence filtering method, system, and non-transitory computer readable medium, include a user location monitoring circuit configured to monitor a pinpoint location of a user and a boundary location of the user, a geofence determining circuit configured to determine a plurality of geofences that overlap with the boundary location of the user, the plurality of geofences being stored in a database, and a cognitive filtering and ranking circuit configured to filter the plurality of geofences that overlap with the boundary location of the user based on a cognitive factor and to rank the filtered geofences based on the cognitive factor to deliver to a user device when a pinpoint location of the user overlaps with the plurality of geofences.

20 Claims, 7 Drawing Sheets

US 9,774,993 B1

SYSTEM, METHOD, AND RECORDING MEDIUM FOR GEOFENCE FILTERING

BACKGROUND

The present invention relates generally to a geofence filtering system, and more particularly, but not by way of limitation, to a system for using cognitive resources to refine a large list of geofences down to a set of geofences that are most relevant to an end user.

A "geofence" is a defined area around a point on a map that is often defined by the area's latitude and longitude. Developers define geofences to enhance their mobile applications such as knowing when to push a message to a customer when they are near a store, or to track individuals so as to turn on the lights in the individual's house when the individual is almost home.

Conventionally, platforms have limitations on the number of geofences that can be monitored. Currently, Android™ is set to 100 geofences and iOS™ has a 20 geofence limitation. In situations where more geofences must be monitored than the platform can handle, it is up to the developers to determine which geofences are returned.

Conventional techniques of filtering geofences only filter based on the geofences within the closest distance to the customer in combination with an expensive Application Program Interface (API) call periodically to check if a big location change has occurred. However, in crowded areas with hundreds, or even thousands, of geofences in a small area, the distance-only filter leads to irrelevant geofences being returned to the user.

SUMMARY

In view of the technical problem in the art of returning irrelevant geofences to a user as a result of the limited number of geofences available on the platforms and the distance-only filter, the inventors have considered the technical solution to the technical problem in which the geofences are filtered based on cognitive preferences of the user as well, as distance to return to the user the most relevant geofences even in areas with a number of geofences exceeding the platform capabilities.

In an exemplary embodiment, the present invention can provide a geofence filtering system including a user location monitoring circuit configured to monitor a pinpoint location of a user and a boundary location of the user, a geofence determining circuit configured to determine a plurality of geofences that overlap with the boundary location of the user, the plurality of geofences being stored in a database, and a cognitive filtering and ranking circuit configured to filter the plurality of geofences that overlap with the boundary location of the user based on a cognitive factor and to rank the filtered geofences based on the cognitive factor to deliver to a user device when a pinpoint location of the user overlaps with the plurality of geofences.

Further, in another exemplary embodiment, the present invention can provide a geofence filtering method including monitoring a pinpoint location of a user and a boundary location of the user, determining a plurality of geofences that overlap with the boundary location of the user, the plurality of geofences being stored in a database, and filtering and ranking the plurality of geofences that overlap with the boundary location of the user based on a cognitive factor and to rank the filtered geofences based on the cognitive factor to deliver to a user device when a pinpoint location of the user overlaps with the plurality of geofences.

Even further, in another exemplary embodiment, the present invention can provide a non-transitory computer-readable recording medium recording a geofence filtering program, the program causing a computer to perform: monitoring a pinpoint location of a user and a boundary location of the user, determining a plurality of geofences that overlap with the boundary location of the user, the plurality of geofences being stored in a database, and filtering and ranking the plurality of geofences that overlap with the boundary location of the user based on a cognitive factor and to rank the filtered geofences based on the cognitive factor to deliver to a user device when a pinpoint location of the user overlaps with the plurality of geofences.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
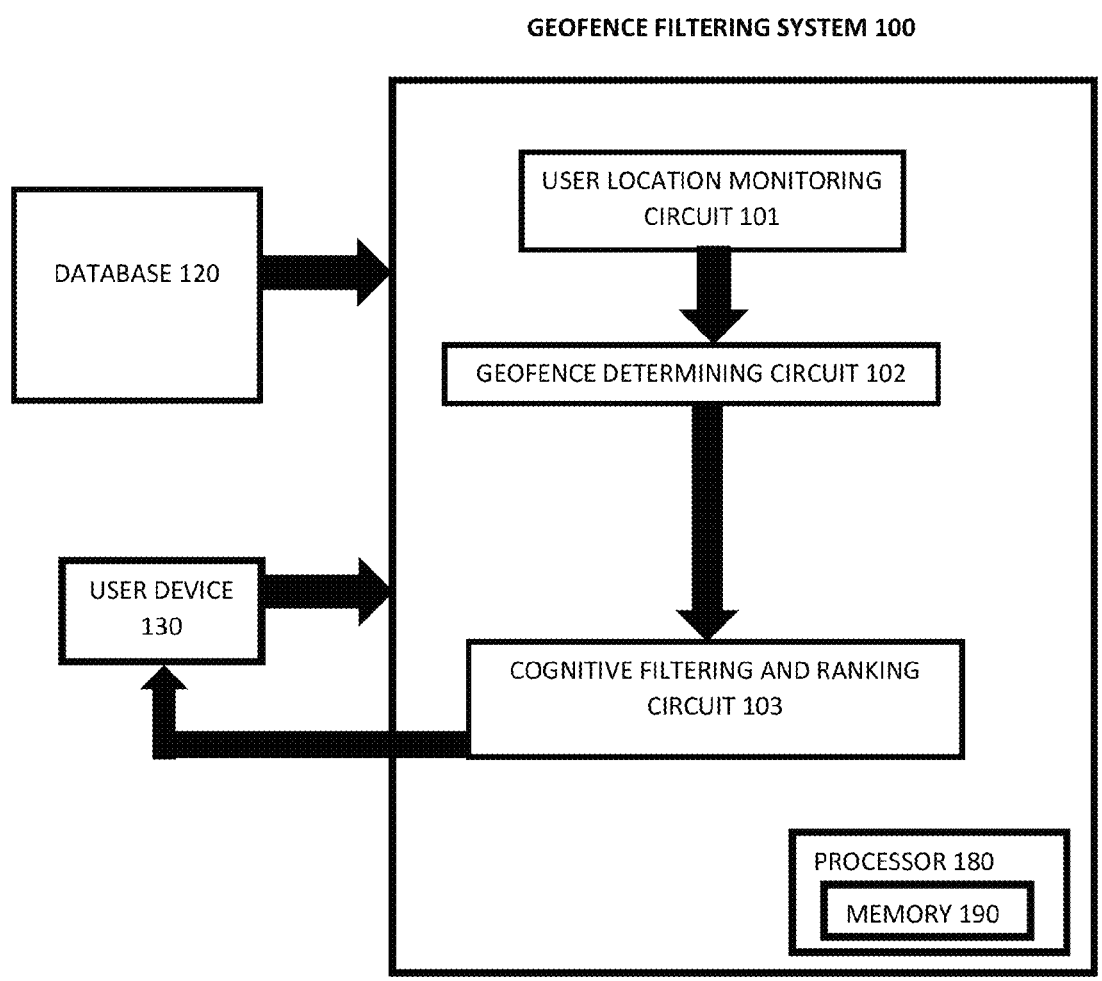
FIG. 1 exemplarily shows a block diagram illustrating a configuration of a geofence filtering system 100.

The invention will now be described with reference to FIGS. 1-8, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the geofence filtering system 100 includes a user location monitoring circuit 101, a geofence determining circuit 102, and a cognitive filtering and ranking circuit 103. The geofence filtering system 100 includes a processor 180 and a memory 190, with the memory 190 storing instructions to cause the processor 180 to execute each circuit of geofence filtering system 100. The processor and memory may be physical hardware components, or a combination of hardware and software components.

Although the geofence filtering system 100 includes various circuits, it should be noted that a geofence filtering system can include modules in which the memory 190 stores instructions to cause the processor 180 to execute each module of geofence filtering system 100.

Also, each circuit can be a stand-alone device, unit, module, etc. that can be interconnected to cooperatively produce a transformation to a result.

With the use of these various circuits, the geofence filtering system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 6:
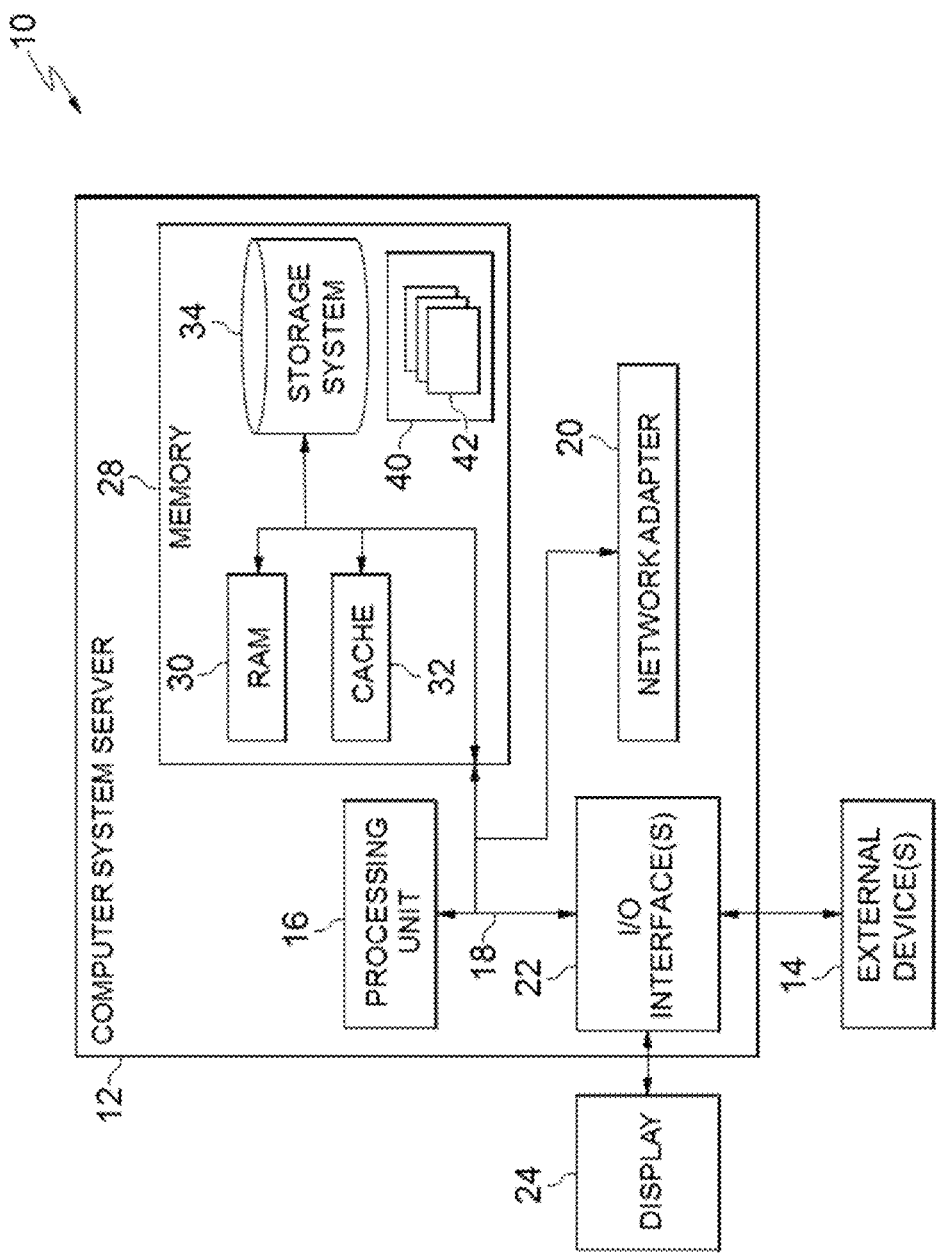
FIG. 6 depicts a cloud computing node 10 according to an exemplary embodiment of the present invention.
Figure 7:
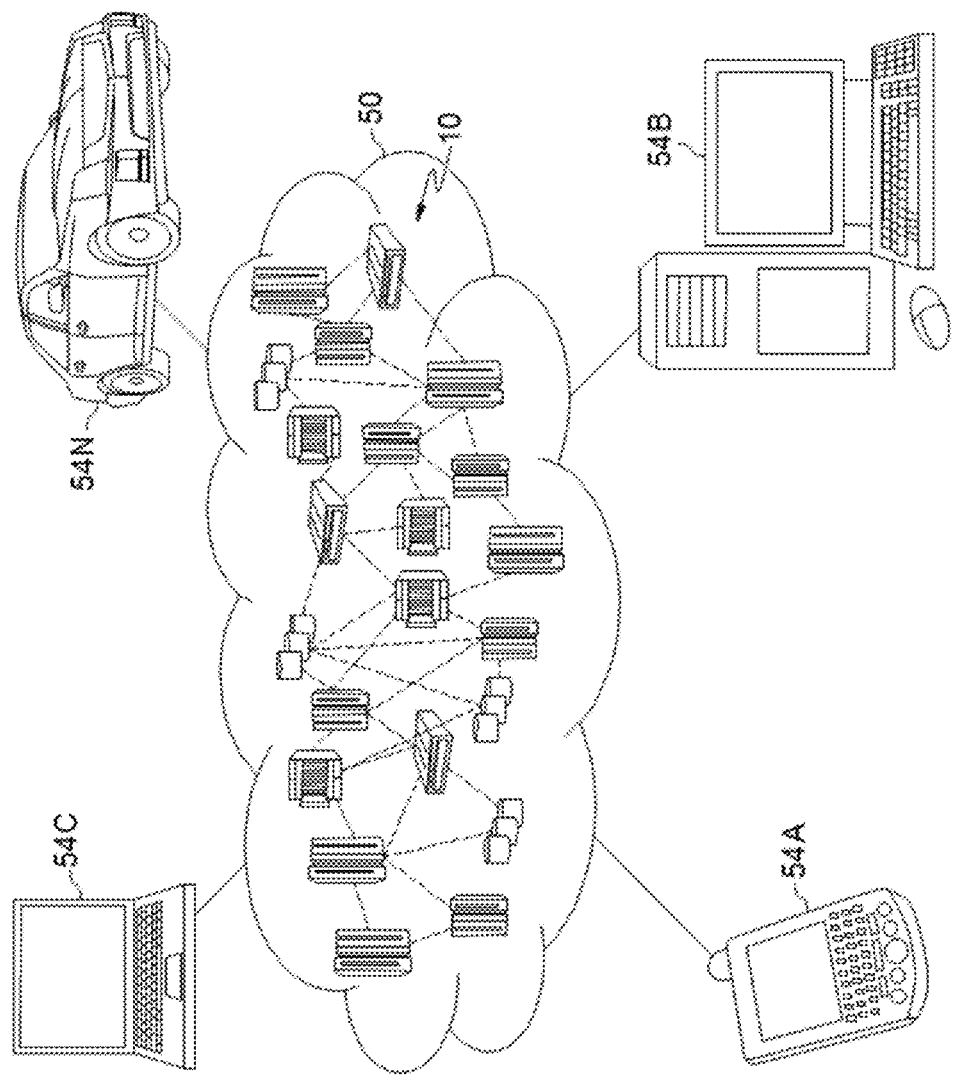
FIG. 7 depicts a cloud computing environment 50 according to another exemplary embodiment of the present invention.
Figure 8:
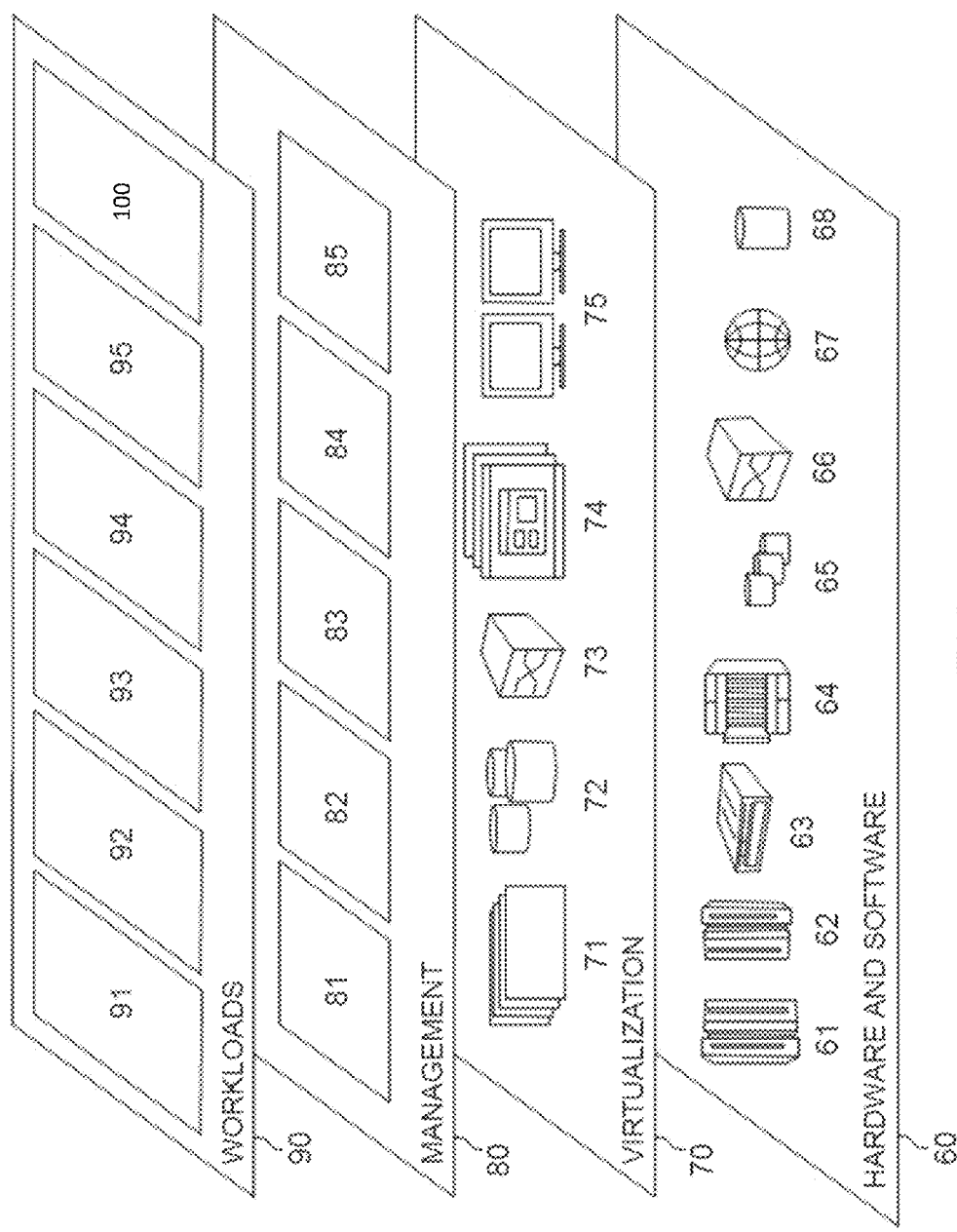
FIG. 8 depicts abstraction model layers according to an exemplary embodiment of the present invention.

Although as shown in FIGS. 6-8 and as described later, the computer system/server 12 is exemplarily shown in cloud computing node 10 as a general-purpose computing circuit which may execute in a layer the geofence filtering system 100 (FIG. 8), it is noted that the present invention can be implemented outside of the cloud environment.

Figure 3:
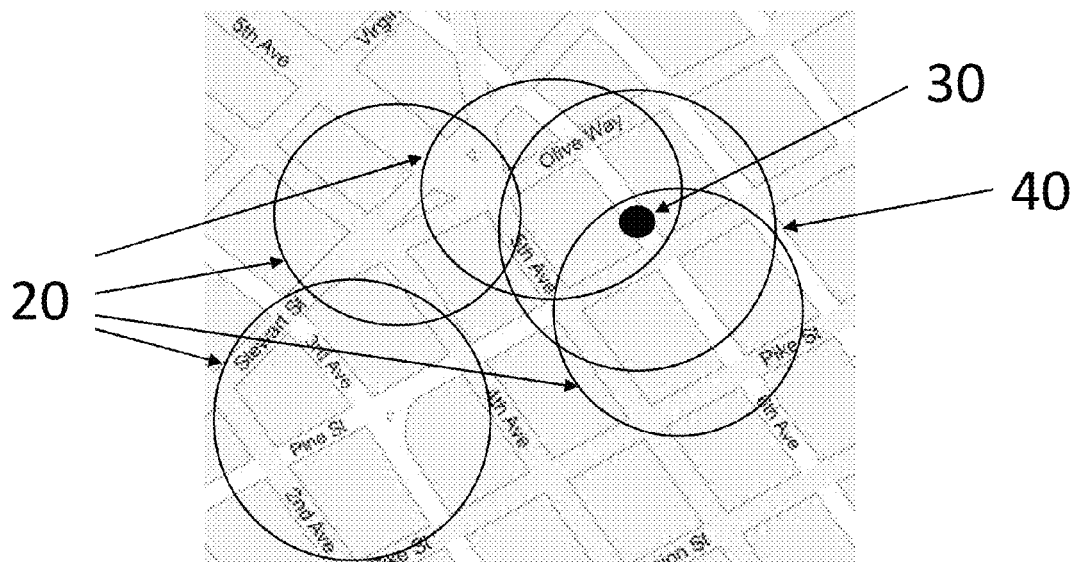
FIG. 3 exemplarily shows a first depiction of geofences 20 in relation to a user pinpoint location 30 and user boundary location 40.
Figure 4:
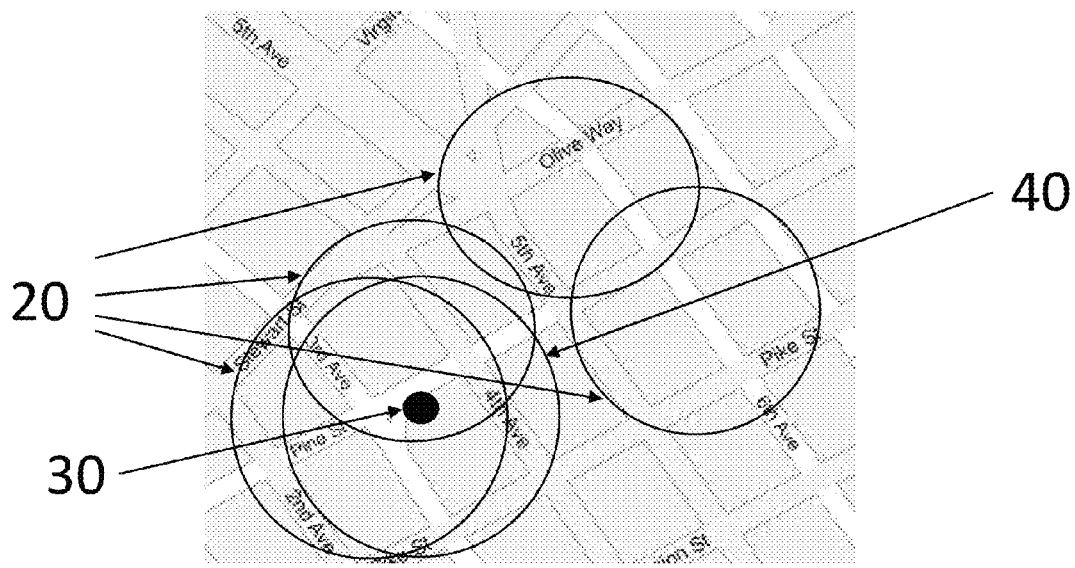
FIG. 4 exemplarily shows a second depiction of geofences 20 in relation to a user pinpoint location 30 and user boundary location 40.

The user location monitoring circuit 101 monitors a location of a user as a pinpoint location 30 and/or a user boundary location 40, as shown in FIG. 3 and FIG. 4. The pinpoint location of the user is a Global Positioning System (GPS) location of the user as tracked by the user device (or other device that enables GPS tracking). The user boundary location is a defined area around a point on a map (i.e., the circle 40 surrounding the pinpoint location of the user 30). For example, as shown in FIG. 3 and FIG. 4 the user boundary location 40 can be a circle having a pre-determined radius set by the user on the user device, such that the user boundary location overlaps with a geofence 20, thus indicating that the user is near the geofence even if the pinpoint location of the user is not within the geofence. It is noted that the size, shape, or type of boundary is not limited to a circle, and can be any type of boundary.

The geofence determining circuit 102 accesses a database 120 including a plurality of geofences 20 and determines a geofence 20 or plurality of geofences 20 that are within the user boundary location 40. Also, the geofence determining circuit 102 determines a geofence 20 or plurality of geofences 20 that the user's pinpoint location 30 is within.

Therefore, the geofence determining circuit 102 determines potential geofences 20 that may be delivered to the user device 130 by determining an overlap between the geofence 20 and the user boundary location 40 along with determining a current overlap of a geofence 20 with the pinpoint location of the user 30.

It is noted that the user location monitoring circuit 101 continuously monitors a location of the user. As shown in FIG. 3 and FIG. 4, the user pinpoint location 30 moves and the user boundary location 40 moves therewith. Accordingly, the geofence determining circuit 102 continuously adjusts which geofences 20 the user may have delivered to the user device 130 (i.e., a collection of geofences).

The cognitive filtering and ranking circuit 103 filters the collection of geofences based on cognitive factors. That is, the cognitive filtering and ranking circuit 103 filters the collection of geofences that the user may have delivered to the user device in order to provide a rank of the most relevant to the least relevant geofences for the user.

The system 100 cognitively filters and ranks a larger subset of the collection of geofences down to the platform limits based on cognitive factors via the cognitive filtering and ranking circuit 103 and the pinpoint location 30 of the user.

The cognitive factors that the cognitive filtering and ranking circuit 103 considers include, but are not limited to, a dwell time (e.g., a length of time that a user been dwelling at a location such as if a user has been at a restaurant for a long time, the cognitive filtering and ranking circuit 103 can assume the user ate and therefore filter any other restaurant geofences), a history of location of the user (e.g., how often is this user performing this action such as assuming a place of work if a user goes to a building every day from 9 A.M.-5 P.M.), personal information (e.g., age, gender, personal preferences to indicate types of geofences to eliminate such as a geofence for baby food store being eliminated for an elderly user), weather (e.g., will the weather prohibit the user from accessing a geofence), time of day, traffic and traffic comparison between geofences, Social/News Alerts (e.g., did an event just let out near a geofence or a gathering of people near a geofence, thereby prohibiting access), a number of people inside geofence (e.g., does the user's profile state they like to be around a lot of people, some people, no people and a decision based on the same), mobile device activity (e.g., is the person wandering, searching for a particular activity that has a matching geofence, or does the person need help), biometrics (e.g., is the user's heart rate relaxed and calm or is the user angry and upset), purchase behavior (e.g., if a user is on vacation but has never before purchased a coffee, returning a geofence around a coffee shop might not be relevant for this user), speech analysis (e.g., an ongoing analysis of speech is performed and inserted into the user's data stream), analysis of mobile device use (e.g., checking if the person is talking, texting or browsing content, direction and cadence of mobile use could detect cognitive state (i.e., alert, distracted, hurried, bored, etc.), venue information (e.g., does this venue have what the person needs? (i.e., a person needs to buy a pair of sandals; determine if the possible nearby locations sell sandals), etc.

The above are examples only and not intended to limit the scope of the disclosure as a person of ordinary skill can determine other cognitive factors to base the filtering of the geofences by the cognitive filtering and ranking circuit 103.

For example, and as shown in FIG. 3 and FIG. 4, the user location monitoring circuit 101 monitors the user pinpoint location 30 and the user boundary location(s) 40 and the geofence determining circuit 102 determines all of the geofences 20 from the database 120. It also determines which geofences 20 overlap with the user pinpoint location 30 and the potential geofences 20 that are near the user based on an overlap of the user boundary location 40 and the geofences 20. The cognitive filtering and ranking circuit 103 filters the geofences 20 based on the above cognitive factors and then ranks the filtered geofences based on the user preferences according to the cognitive factors. Therefore, as the user pinpoint location 30 overlaps with geofences as determined by the geofence determining circuit 102, the cognitive filtering and ranking circuit 103 delivers the ranked list of geofences to the user device 130.

It is noted that the cognitive filtering and ranking circuit 103 continuously updates the ranking of geofences 20 not only as the location of the user changes but as the cognitive state of the user (i.e., mood, speech analysis, etc.) or features of the geofences change (i.e., weather, crowd, time of day, etc.) such that the geofences 20 delivered to the user device 130 are updated in real time according to the cognitive factors.

For example, as shown in FIG. 3, the user boundary location 40 overlaps with three potential geofences 20 but the user pinpoint location 30 overlaps with two geofences 20. The cognitive filtering and ranking circuit 103 will filter and rank each of the three geofences 20 that overlap with the user boundary location 40 but deliver the two geofences that overlap with the user pinpoint location 30 according to their filter and rank.

That is, the cognitive filtering and ranking circuit 103 can include a learned mapping between a set of cognitive states (x) and a set of geofences (y). The mapping is then employed to alter a user's selected monitored geofences 20. The mapping is updated dynamically as a user enters new cognitive states, x(t). In this way, a set of geofences 20 monitored continually reflects the current cognitive state of a user.

Figure 5:
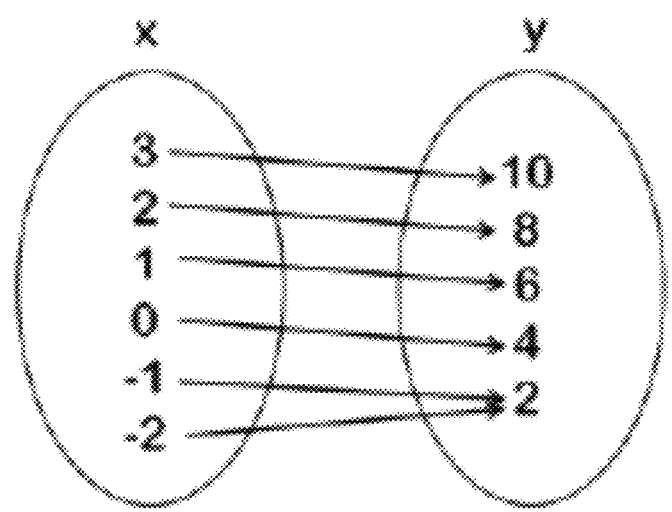
FIG. 5 depicts an exemplary learned mapping between a set of cognitive states (x) and a set of geofences (y).

The learned mapping of the cognitive filtering and ranking circuit 103 is a mapping of a cognitive state vector (x) at some time point, t, to a set of geofences (y) as exemplarily shown in FIG. 5.

Feature extraction techniques for identifying certain cognitive states are used. Specifically, the reduction of a set of behavioral measures over some period of time to a set of feature nodes and vectors, corresponding to the behavioral measures' representations in the lower dimensional feature space, is used to identify the emergence of a certain cognitive state x(t) over that period of time.

The relationship of one feature node to other similar nodes through edges in a graph corresponds to the temporal order of transitions from one set of measures and the feature nodes and vectors to another. Some connected subgraphs of the feature nodes are herein defined as a cognitive trait. The present disclosure describes the analysis, categorization, and identification of these cognitive traits of further feature analysis of subgraphs, including dimensionality reduction of the subgraphs, for example by graphical analysis, which extracts topological features and categorizes the resultant subgraph and its associated feature nodes and edges within a subgraph feature space.

A cognitive state is therefore defined as a representation of measures of a user's total behavior over some period of time (including musculoskeletal gestures, speech gestures, internal physiological changes, measured by imaging devices, microphones, physiological and kinematic sensors in a high dimensional measurement space) within a lower dimensional feature space. Of course, these measures may be further conditioned by user specified electronic data from calendars, emails, or other sources.

The cognitive filtering and ranking circuit 103 then updates the mapping x(t) and (y) continually, as a user's emotional or cognitive state changes (e.g., sleepy vs. awake), as it become clear a user is trying to fulfill a particular need (e.g., hunger), and as certain geofence descriptors match these states better than others (e.g., park vs. restaurant district). Applications triggered by the remapped geofences therefore appear to sense both user location in geophysical space and in cogno-physical space, a combination of locations that is ideal for marketing and advertising directly to target markets of interest.

The use of cognitive sensors can be embedded in a self-driving car (SDC) to establish the mapping, and the delivery of geofence specific data to be associated with GPS functions on the SDC, as well as internal display in the vehicle such as surround LCDs and audio systems.

Also, the cognitive filtering and ranking circuit 103 can store the resultant rankings of the geofences 20 in the database 120 and mappings (FIG. 5) such that when the user re-renters the area of the map, the cognitive filtering and ranking circuit 103 can start a new ranking from the previously ranked geofence data.

Figure 2:
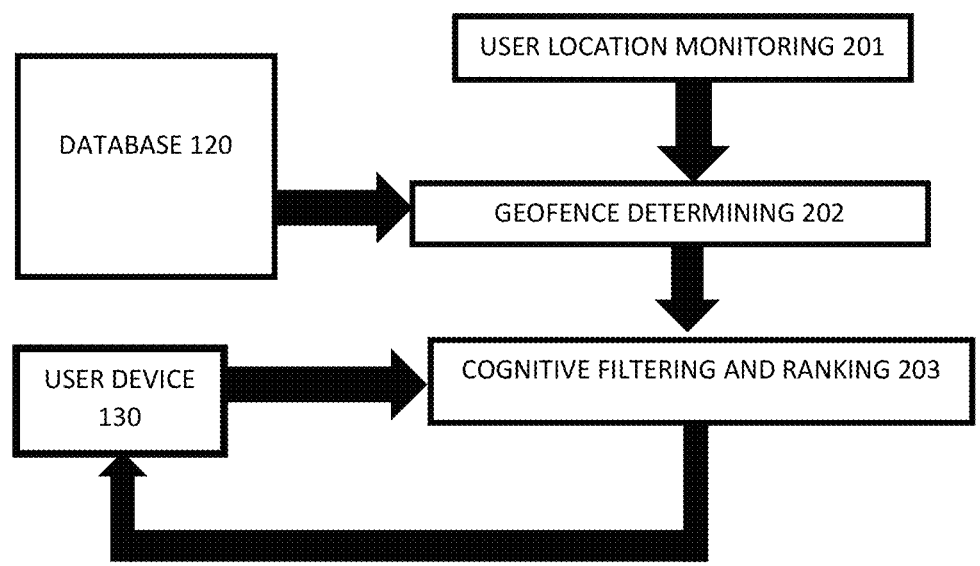
FIG. 2 exemplarily shows a high level flow chart for a geofence filtering method 200.

FIG. 2 shows a high level flow chart for a method 200 of geofence filtering.

Step 201 monitors a user location as a user pinpoint location 30 and a user boundary location 40.

Step 202 accesses a database 120 including a plurality of geofences 20 and determines a geofence 20 or plurality of geofences 20 that are within the user boundary location 40. Also, Step 202 determines a geofence 20 or plurality of geofences 20 that the users pinpoint location 30 is within.

Step 203 filters the collection of geofences based on cognitive factors. That is, Step 203 filters the collection of geofences that the user may have delivered to the user device and subsequently ranks the filtered list based on the most relevant to the least relevant geofences for the user according to the cognitive filtered geofences 20.

Step 203 also delivers the ranked list of geofences to the user device 130.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 6, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 7, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the geofence filtering system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A geofence filtering system comprising:
   a user location monitoring circuit configured to monitor a pinpoint location of a user and a boundary location of the user;
   a geofence determining circuit configured to determine a plurality of geofences that overlap with the boundary location of the user, the plurality of geofences being stored in a database; and
   a cognitive filtering and ranking circuit configured to filter the plurality of geofences that overlap with the boundary location of the user based on a cognitive factor relating to a behavioral measure of the user and to rank the filtered geofences based on the cognitive factor to deliver to a user device when the pinpoint location of the user overlaps with the plurality of geofences,
   wherein the behavioral measure is not a measure of constant motion through space.

2. The system of claim 1, wherein the cognitive filtering and ranking circuit dynamically filters and ranks the plurality of geofences that overlap with the boundary location of the user such that the filtered and ranked geofences correspond to a real-time cognitive state when the pinpoint location of the user overlaps with the filtered and ranked geofences.

3. The system of claim 1, wherein the cognitive filtering and ranking circuit includes a learned mapping between a set of predetermined cognitive states and the plurality of geofences stored in the database, and
   wherein the cognitive filtering and ranking circuit continuously updates the ranking of the plurality of geofences based on the user having a predetermined cognitive state of the set of predetermined cognitive states.

4. The system of claim 1, wherein the cognitive filtering and ranking circuit filters all of the plurality of geofences based on the cognitive factor regardless of a location of the user.

5. The system of claim 1, wherein the cognitive filtering and ranking circuit stores at least one of the ranked geofences and the mappings in the database.

6. The system of claim 1, wherein the user selectively sets a size of the boundary location of the user.

7. The system of claim 1, wherein the cognitive filtering and ranking circuit selectively sets a size of the geofence.

8. The system of claim 1, wherein a number of the ranked filtered geofences delivered to the user device is based on an operating system of the user device.

9. The system of claim 1, wherein the cognitive factor includes at least one of:
   a dwell time of the user;
   a location history of the user;
   personal information of the user;
   weather data of the plurality of geofences;
   a time of day;
   a current state of traffic and traffic data between the plurality of geofences and the pinpoint location of the user;
   a social alert;
   a news alert;
   a number of people inside the plurality of geofences;
   an activity of the user device;
   biometric data of the user;
   a prior purchase behavior of the user;
   a speech analysis of the user;
   an analysis of user device usage; and
   venue information.

10. A geofence filtering method comprising:
    monitoring a pinpoint location of a user and a boundary location of the user;
    determining a plurality of geofences that overlap with the boundary location of the user, the plurality of geofences being stored in a database; and
    filtering the plurality of geofences that overlap with the boundary location of the user based on a cognitive factor relating to a behavioral measure of the user and ranking the filtered geofences based on the cognitive factor to deliver to a user device when the pinpoint location of the user overlaps with the plurality of geofences,
    wherein the behavioral measure is not a measure of constant motion through space.

11. The method of claim 10, wherein the filtering and ranking further dynamically filters and ranks the plurality of geofences that overlap with the boundary location of the user such that the filtered and ranked geofences correspond to a real-time cognitive state when the pinpoint location of the user overlaps with the filtered and ranked geofences.

12. The method of claim 10, wherein the filtering and ranking further filters and ranks based on a learned mapping between a set of predetermined cognitive states and the plurality of geofences stored in the database, and
    wherein the filtering and ranking continuously updates the ranking of the plurality of geofences based on the user having a predetermined cognitive state of the set of predetermined cognitive states.

13. The method of claim 10, wherein the filtering and ranking further filters all of the plurality of geofences based on the cognitive factor regardless of a location of the user.

14. The method of claim 10, wherein the filtering and ranking further stores at least one of the ranked geofences and the mapping in the database.

15. The method of claim 10, wherein the user selectively sets a size of the boundary location of the user.

16. The method of claim 10, wherein the filtering and ranking selectively sets a size of the geofence.

17. A non-transitory computer-readable recording medium recording a geofence filtering program, the program causing a computer to perform:
- monitoring a pinpoint location of a user and a boundary location of the user;
- determining a plurality of geofences that overlap with the boundary location of the user, the plurality of geofences being stored in a database; and
- filtering the plurality of geofences that overlap with the boundary location of the user based on a cognitive factor relating to a behavioral measure of the user and ranking the filtered geofences based on the cognitive factor to deliver to a user device when the pinpoint location of the user overlaps with the plurality of geofences,
- wherein the behavioral measure is not a measure of constant motion through space.

18. The non-transitory computer-readable recording medium of claim 17, wherein the filtering and ranking further dynamically filters and ranks the plurality of geofences that overlap with the boundary location of the user such that the filtered and ranked geofences correspond to a real-time cognitive state when the pinpoint location of the user overlaps with the filtered and ranked geofences.

19. The non-transitory computer-readable recording medium of claim 17, wherein the filtering and ranking further filters and ranks based on a learned mapping between a set of predetermined cognitive states and the plurality of geofences stored in the database, and
- wherein the filtering and ranking continuously updates the ranking of the plurality of geofences based on the user having one of the set of predetermined cognitive states.

20. The non-transitory computer-readable recording medium of claim 17, wherein the filtering and ranking further filters all of the plurality of geofences based on the cognitive factor regardless of a location of the user.

* * * * *